United States Patent [19]

Prentice et al.

[11] Patent Number: 5,171,768
[45] Date of Patent: Dec. 15, 1992

[54] PROCESS FOR THE PRODUCTION OF CARBOXYLATED LATEXES BY THE SELECTIVE MONOMER ADDITION AND POLYMERIZATION

[75] Inventors: Susan M. Prentice; Ramesh N. Gujarathi; Sun-Lin Chen, all of Akron, Ohio

[73] Assignee: The Goodyear Tire & Rubber Company, Akron, Ohio

[21] Appl. No.: 779,665

[22] Filed: Oct. 21, 1991

[51] Int. Cl.$^5$ .............................. C08F 2/22; C08F 2/24
[52] U.S. Cl. .................... 523/348; 524/458; 524/460; 524/822; 523/353
[58] Field of Search ................ 524/460, 458, 822; 523/348, 353

[56] References Cited

U.S. PATENT DOCUMENTS

| | | | |
|---|---|---|---|
| 4,226,752 | 10/1980 | Erickson et al. | 514/460 |
| 4,272,426 | 6/1981 | Fest | 526/80 X |
| 4,381,365 | 4/1983 | Mishiba et al. | 524/460 |
| 4,480,078 | 10/1984 | Gujarathi | 524/460 X |
| 4,559,374 | 12/1985 | Senyek et al. | 524/460 X |
| 4,569,964 | 2/1986 | Lee et al. | 524/460 |
| 4,613,633 | 9/1986 | Sekiya et al. | 524/460 X |
| 5,002,982 | 3/1991 | Neubert | 524/460 X |

*Primary Examiner*—Joseph L. Schofer
*Assistant Examiner*—J. M. Reddick
*Attorney, Agent, or Firm*—Bruce J. Hendricks

[57] ABSTRACT

The present invention relates to a free radical emulsion polymerization process. The latex is prepared by polymerizing (a) at least one conjugated diene, (b) at least one non-carboxylic vinyl aromatic or aliphatic comonomer selected from the group consisting of styrene, α-methyl styrene, p-methyl styrene, vinyl toleuene, acrylonitrile, methacrylonitrile, vinylidene chloride, ethyl acrylate, butyl acrylate, vinyl pyridine, methylmethacrylate, hexylacrylate, 2-ethyl hexyl acrylate or mixtures thereof, and (c) at least one ethylenically unsaturated carboxylic acid monomer selected from the group consisting of acrylic acid, methacrylic acid, maleic acid, fumaric acid, 3-carboxyethylacrylate, itaconic acid or mixtures thereof. The process of the present invention is characterized by (a) initially polymerizing the non-carboxylic comonomer in the presence of the unsaturated carboxylic acid and in the absence of any conjugated diene to a conversion of 3 to 12 percent to form a partially polymerized latex; and thereafter (b) copolymerizing the conjugated diene with the unreacted non-carboxylic comonomer in the partially polymerized latex. The present process mitigates the formation of codimers of the conjugated diene and non-carboxylic comonomer. The present process also provides a latex having unique film forming characteristics and polymer morphology leading to unique film stiffness and stress-strain relationship.

19 Claims, No Drawings

PROCESS FOR THE PRODUCTION OF CARBOXYLATED LATEXES BY THE SELECTIVE MONOMER ADDITION AND POLYMERIZATION

BACKGROUND OF THE INVENTION

Carboxylated latex, for example styrene. butadiene-itaconic acid terpolymers, have been prepared by a variety of methods. For example, U.S. Pat. No. 4,480,078 discloses a continuous emulsion polymerization process for producing carboxylated styrene-butadiene latices characterized in that only a portion of the primary monomers are charged to the first reaction zone followed by subsequent injection of the remaining portion of the primary monomers to the following reaction zone in an overall process using two or more conjugated diene and the non carboxylic acid monomer is added to the first reaction zone with the remaining portion of each primary monomer being charged thereafter. Unfortunately, this method still contributes to the significant formation of 4-phenylcyclohexene (4-PCH).

SUMMARY OF THE INVENTION

The present invention relates to a method for decreasing the formation of 4-PCH in a process for producing carboxylated latexes. The present method is characterized by the pre-polymerization of the noncarboxylic comonomer and the selective addition of the conjugated diene monomer(s). The process of the present invention provides a latex having unique film forming characteristics and polymer morphology.

DETAILED DESCRIPTION OF THE PREFERRED INVENTION

There is disclosed a free radical emulsion polymerization process for the production of a latex comprising polymerizing (a) at least one conjugated diene, (b) at least one non-carboxylic vinyl aromatic or aliphatic comonomer selected from the group consisting of styrene, α-methyl styrene, para-methyl styrene, vinyl toluene, acrylonitrile, methacrylonitrile, vinylidene chloride, ethyl acrylate, butyl acrylate, vinyl pyridine, acrylate or mixtures thereof, and (c) at least one ethylenically unsaturated carboxylic acid monomer selected from the group consisting of acrylic acid, methacrylic acid, maleic acid, fumaric acid, β-carboxyethyl acrylate, and itaconic acid, wherein the method comprises (a) initially polymerizing the non. carboxylic comonomer in the presence of the unsaturated carboxylic acid monomer and in the absence of any conjugated diene to a conversion of 3 to 12 percent to form a partially polymerized latex; and copolymerizing the conjugated diene with the non. carboxylic comonomer in the partially polymerized latex.

The process of the present invention has numerous advantages over the current methods of production. For example, the process of the present invention results in a decreased formation of 4.PCH. Conventionally, carboxylated styrene-butadiene latexes are characterized by the high levels of 4.PCH. Unfortunately, attempts to remove significant levels of 4-PCH contributes to the expense of production.

The reaction mixtures or ingredients (sometimes referred to as polymerization recipes) that are used in the process of the present invention are comprised of (1) water which is added in sufficient amount to provide latex having a solids content of 49 to 54 percent by weight after polymerization, (2) primary monomers, (3) monomeric carboxylic acids, (4) chain transfer agents, (5) nonpolymerizable substituents such as (a) electrolytes, (b) chelating agents, (c) emulsifiers, and (6) initiators.

The primary monomers in the reaction mixture of the present invention are comprised of conjugated dienes preferably having 4 to 10 carbon atoms and one or more noncarboxylic comonomers. Examples of conjugated diene type monomers are isoprene, 2,3-dimethyl butadiene, 1,3-butadiene, 2-methyl-1,3-butadiene, 2-ethyl-1,3-butadiene, 1,3-pentadiene, 2-methyl-1,3-pentadiene, 3,4-dimethyl 1,3-hexadiene, 1,3-heptadiene, 1,3-octadiene, 4,5-diethyl-1,3-octadiene, 3-methyl-1,3-pentadiene, 4-methyl-3-pentadiene or mixtures thereof. Substituted conjugated dienes such as chloro or cyano butadiene may be used if desires. Butadiene is the preferred conjugated diene. The conjugated diene comprises 20 to 60 percent by weight of the way, the carboxylated polymer is derived from about 20 to 60 weight percent of the conjugated diene. Preferably, the conjugated diene comprises 30 to 45 percent by weight of the total monomer in the final product.

The noncarboxylic vinyl aromatic or aliphatic comonomers may be vinyl aromatic compounds, such as styrene, α-methylstyrene, p-methylstyrene, and vinyl toluene, or an aliphatic monomer, such as unsaturated nitrile, for example acrylonitrile or methacrylonitrile. Other vinyl monomers such as vinylidine chloride, ethyl acrylate, butyl acrylate, vinyl pyridine, methyl methacrylate, hexyl acrylate, butyl acrylate, methyl methacrylate, hexyl acrylate, 2-ethyl hexyl acrylate may be used. The amount of weight of total monomers in the final product. Stated the alternative, the carboxylated polymer is derived from about 40 to 80 percent by weight of the noncarboxylic comonomer. Preferably, the noncarboxylic comonomer comprises 55 to 70 percent by weight of the total monomer in the final product.

Representative of the ethylenically unsaturated carboxylic acid monomers that can be used in the process of this invention are acrylic acid, methacrylic acid, maleic acid, fumaric acid, β-carboxyethyl acrylate, itaconic acid or mixtures thereof. Preferably, itaconic acid is used. The amount of carboxylic acid monomer used may range from about 0.5 to 10 percent by weight based on total monomers. Therefore, the carboxylated polymer is derived from about 0.5 to 10 percent by weight of carboxylic acid monomer. Preferably, the amount of carboxylic acid monomer ranges from about 1.5 to about 2.5 percent by weight based on total monomer. The carboxylic acid monomer is preferably charged to the reactor along with the non-carboxylic comonomer. Therefore, when all of the noncarboxylic comonomer is initially charged to the reaction zone prior to initiating polymerization, all of the carboxylic acid monomer may be charged. However, one may introduce a #portion of the carboxylic acid monomer (from about 20 to about 80 weight percent of the total used) with the noncarboxylic comonomer and charge the remaining carboxylic acid monomer (80 to 20 weight percent) with the conjugated diene.

Other functional or specialty monomers in addition to the above may be included in the process of this invention to effect certain polymerization and application properties. Among the types of functional monomers which have been traditionally employed are those containing hydroxyl, amide, methylolamide, ester, amine, epoxy, aldehyde and halogen functional groups. Typical of these specialty monomers are hydroxy ethyl and propyl acrylates and methacrylates, acrylamide, methacrylamide, N-methylol acrylamide, mono and di esters of polycarboxylic acids such as methyl and n-butyl itaconate, n-dibutyl itaconate, dibutyl maleate and fumarate and dimethylaminoethyl methacrylate. In addition, monomers such as 1-(1-isocyanate-1-methylethyl)-3-(1-methylethenyl)benzene, tetrahydro-N-{1-methyl-1-[3-(1-methylethenyl)phenyl]ethyl}-2-oxo 1H-pyrrolo-1-carboxamide and hexahydro-N-{1-methyl-1-[3-(1-methylethenyl)phenyl]ethyl}-2-oxo-1H-azepine-1carboxamide may be used. Functional monomers in the amount of 0.1 to 5 percent of total monomer in the reaction mixture can be added. When a plurality of reaction zones, i.e., three are used, these functional monomers may be added either to the first second or third reactor depending upon the desired distribution required to influence certain polymerization and application properties.

Modifiers or chain transfer agents used in the process of the invention are short or long-chain alkyl mercaptans and are used to control the molecular weight of the polymers. Representative of the mercaptans that can be used in the process of the present invention are n-octyl mercaptan, n-nonyl mercaptan, tertiary-nonyl mercaptan, n-decyl mercaptan, normal-dodecyl mercaptan, sec-dodecyl mercaptan, tert-dodecyl mercaptan, tert-tetradecyl mercaptan, tert-hexadecyl mercaptan, sec-hexadecyl mercaptan, n-hexadecyl mercaptan or mixtures of mercaptans. It is possible to employ any of such modifiers individually or in combination contingent to achieving desired polymer properties. With the monomeric systems of this invention, it is preferable that a modifier be present. Chain transfer agents are conventionally used at a level of 0.2 to 0.8 phm (parts per one hundred parts of monomers). The preferred chain transfer agent is tertiary-dodecyl mercaptan. It may either be premixed with the primary monomers or charged separately. It is also preferred that the modifier be split and charged to different reaction zones.

The process of the present invention also contemplates the incorporation of polymerizable antioxidants. These antioxidants have shown great potential in the stabilization of oxidizable organic materials due to their nonextractability as monomers are polymerized with one or more comonomers so as to have the antioxidant moiety chemically attached to the polymer structure. The following list is representative of polymerizable antioxidants that can be used in the process of this invention and is not intended to be limited: N-(4-anilinophenyl) acrylamide, N (4-anilinophenyl)methacrylamide, N-(4-anilinophenyl)maleimide, N-(4-anilinophenyl)-itaconimide, 4-anilinophenyl acrylate, 4-anilinophenyl methacrylate, and 3-N-(4'-anilinophenyl)amino-2-hydroxy-propyl methacrylate.

These polymerizable antioxidants are known in the art and are covered by numerous U.S. patents. They are incorporated in conventional antioxidant amounts known to those skilled in the art. These polymerizable antioxidants can be considered functional or specialty monomers and may be used accordingly.

The preparation of a polymer latex employs many different nonpolymerizable components whose function to a great deal is interdependent. The present invention contemplates the use of these prior known nonpolymerizable components generally employed in emulsion polymerization technology. Thus, the aqueous phase in the reaction mixture may include chelating agents, electrolytes, emulsifying agents or surfactants and similar ingredients.

Conventional chelating agents may be included in the reaction mixture. Representative chelating agents known to those skilled in the art include the sodium salt of N,N-di-(2-hydroxyethyl)glycine, the pentasodium salt of diethylenetriamine pentacetic acid, the trisodium salt of N (hydroxyethyl) ethylenediamine triacetic acid, the trisodium of nitrilotriacetic acid and the sodium salt of ethylene diamine tetracetic acid. Conventionally the amount of chelating agent will range from about 0.05 to about 0.25 parts per hundred parts of monomer (phm).

The electrolytes suitable for use in the reaction mixture of this invention are those which are traditionally used in the latex industry. Typical of these electrolytes are tri and tetra sodium and potassium pyrophosphates and phosphates, sodium, potassium and ammonium carbonates, bicarbontes and sulfates. More specifically, tetrasodium pyrophosphate is preferred. The concentration of electrolyte in the reaction mixture is that minimum necessary for achieving their desired optimum effect. The amount of electrolytes which are conventionally used range from about 0.05 to about 0.5 phm.

A listing of various emulsifiers and detergents which may be useful in the present process is given in the book McCutcheon's Emulsifiers and Detergents 1981 Annuals, which is incorporated by reference in its entirety.

The emulsifier system in the reaction mixture may be a combination of one or more surfactants of the anionic, cationic, non-ionic or amphoteric class of surfactants. Typical of some of the anionic emulsifying agents are alkyl sulfonate, alkyl aryl sulfonates, condensed naphthalene sulfonates, alkyl sulfates, ethoxylated sulfates, phosphate esters and esters of sulfosuccinic acid. Representative of these surfactants are sodium alpha-olefin ($C_{14}$-$C_{16}$) sulfonates, alkali metal or ammonium dodecylbenzene sulfonate, disodium dodecyl diphenyloxide disulfonate, disodium palmityl diphenyloxide disulfonate, sodium potassium or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutylsulfosuccinate, disodium ethoxylated nonyl phenol half ester of sulfosuccinic acid, tetra sodium N, (1,2-dicarboxyethyl)-N-octadecyl sulfosuccinamate, disodium isodecyl sulfosuccinate, sodium bistridecyl sulfosuccinate, sodium salt of alkyl aryl polyether sulfate, lauryl alcohol ether sulfate, sodium salt of condensed naphthalene sulfonic acid, complex phosphate ester of ethylene oxide adduct and mixtures thereof. A total concentration of the emulsifier system is normally included in the reaction mixture in an amount of about 0.3 to 8 phm. It has been found particularly desirable that the surfactant system of this invention be employed more suitably at the active level of 0.3 to 2 phm for optimum latex properties.

Free radical initiators or catalysts employed in the process of this invention are those that are traditionally used in emulsion polymerization. Typically free radical initiators are persulfates, peroxides and hydroperoxides; more specifically, sodium, potassium and ammonium persulfate, hydrogen peroxide, t-butyl hydroperoxide, cumene hydroperoxide, para-menthane hydroperoxide and peroxy carbonates. Other initiators of similar decomposition mechanism may be used if desired.

Ammonium persulfate, a preferred catalyst system at a concentration of 0.2–0.8 phm is premixed with a portion of the electrolyte and water and this aqueous solution of the catalyst is charged to the bottom or the first reactor. A portion of the catalyst solution may be charged in the latter stages of polymerization to achieve substantial reduction of residual unreacted monomers in the latex.

The process may be carried out in a batch or semi continuous process, however, due to economic and production reasons the process is preferably carried out on a continuous basis. Two or more reaction zones, preferably three or four reaction zones, meant a reaction vessel that will withstand the superatmospheric pressures involved and also provides a means of keeping the particular reaction zones at the appropriate temperature.

Preferably, the process should be carried out in a chain consisting of four "continuous stirred-tank reactors" (CSTR) connected in series. The polymerization is conducted preferably at pH of 1.5 to 2.5 and under constant pressure of 130–210 psig controlled by the back pressure regulator provided in the system. Constant temperature is maintained in each reaction zone during polymerization. Preferably, the first zone is maintained at 65° C.–85° C., the second, third and fourth zones at 75° C.–93° C.

Different reaction components are supplied at the appropriate charge rate so that the total residence time which corresponds to the reaction time is 6 to 15 hours, for example, when four reaction zones are used, the residence time may be 15 minutes for the first reaction zone, and 2 to 5 hours for each of the following reaction zones. Lower polymerization temperatures of 60° C. to 75° C. may be used if desired by extending the reaction time.

Various feed-streams in the process containing different reaction components are preferably supplied at the base of a zone in a chain. Functional monomer feed stream, however, can be supplied from the top of a zone through the dip-leg pipe extended to the bottom or the zone.

When the process is carried out in a continuous mode, with four reaction zones all of the nonfirst reaction zone, along with from about 70 to about 95 weight percent of the total soap solution to be used, along with from about 60 to about 80 weight percent of the total initiator solution to be used and along with from about 55 to about 75 weight percent of the total modifier to be used. The catalyst solution is preferably charged separately at the base of the first reaction zone. The buffer stream consisting of a mixture of water, emulsifiers, electrolyte, chelating agent, monomeric carboxylic acid monomer and the non-carboxylic comonomer and the modifier; may be mixed and heated in an inline static mixer while being charged continuously at the base of the first reaction zone through a common header. Premixing of these reaction components helps to pre-emulsify the non. carboxylic comonomer. The reaction mixture is then polymerized to a conversion of from about 3 to 12 percent. Preferably, the polymerization is conducted until a conversion of from about 5 to 10 percent is achieved. The partially polymerized latex is withdrawn from the first reaction zone continuously at a rate equal to the total rate of addition of the mixture of reagents to the first reaction zone. Preferably, the partially polymerized latex is removed from the reaction zone to the second reaction zone before the conjugated diene is introduced. Into the second reaction zone is charged the partially polymerized latex from the first reaction zone and the conjugated diene. All of the conjugated diene may be added at this stage or a first portion of the conjugated diene is added. Preferably, from about 45 to about 65 weight percent of the total conjugated diene to be polymerized is charged at this stage. The copolymerization is initiated between the conjugated diene and the unreacted non-carboxylic comonomer in the partially polymerized latex. The copolymerization is allowed to continue until a conversion of from about 60 to 85 percent is achieved. Preferably, a conversion of from about 70 to 80 is achieved. In such continuous mode, the partially copolymerized latex is withdrawn from the second reaction zone continuously at a rate equal to the total rate of addition of the partially polymerized latex and additional reagents to the second reaction zone. Into the third reaction zone is charged the partially copolymerized latex from the second reaction zone and any remaining soap solution, initiator solution, conjugated diene and modifier. The copolymerization of any unreacted conjugated diene and non-carboxylic comonomer is continued until a conversion of from about 70 to about 99% is achieved. Preferably, the conversion in the third reaction zone is from about 80 to about 90 percent. Similarly, the latex is withdrawn from the third reaction zone continuously at a rate equal to the total rate of addition of the partially polymerized latex and additional reagents to the third reaction zone. From the third reaction zone, the partially copolymerized latex is introduced to the fourth reaction zone when the copolymerization is completed until a final conversion of from about 80 to about 100 percent is achieved. Preferably, the conversion is from about 90 to 99 percent. The fourth reaction zone is partially neutralized and subjected to steam-stripping to remove residual unreacted monomers. Post additives such as antioxidants, dispersants and bactericides may be added to the latex The following examples are intended to illustrate and not limit the scope of the present invention.

EXAMPLE 1

The following example in accordance with the present invention was carried out on a commercial scale. The equipment consisted of one 680 gallon 316 stainless steel reactor equipped with cooling coils and agitating means, two 316 stainless steel 10,000 gallon reactors and one 316 stainless steel 7,500 gallon reactor connected in a series. Each reactor was jacketed for the circulation of heating and cooling medium which was controlled automatically to maintain desired polymerization temperature. Constant pressure higher than the autogenous pressure of the reaction mixture was also maintained with the backpressure regulator installed on the latex overflow outlet line on the third reactor with the fourth reactor being maintained at a pressure of approximately 45 to 75 psig.

Various solutions containing different reaction ingredients were premixed in the make-up or charge tanks. Continuous charge streams except the primary monomers were metered into the respective zones with metering pumps. The styrene stream was divided and charge continuously to the first reaction zone by a positive displacement piston meter whereas the butadiene was charged continuously to the second reaction zone.

Metering was controlled by a Blendtrol ™ system equipped with a microprocessor. (Micro-Blentrol ™, registered trademark of Foxboro Company).

The buffer stream, itaconic acid stream, and the styrene stream designated for the first zone were premixed and heated in a heat exchanger and charged through a common line connected at the bottom of the first zone. The stabilized persulfate stream was charged through separate lines also connected at the bottom of the first zone. The butadiene streams designated for the second and third reaction zones were injected at the base of each reaction zone. The buffer stream and stabilized persulfate stream for reactor 3 were charged separately. The reaction mixture was passed from the first to the second and to the third zone and finally to the fourth zone after a certain residence time in each zone, which is determined by charge rates and the zone capacity. The four-stage polymerized latex was continuously removed from the top of the last zone and subjected to further processing, i.e., steam stripping.

A carboxylated styrene-butadiene latex based on the following formulation was prepared by the above process of this invention.

TABLE I

| Ingredient | | Active Parts By Weight (phm) |
|---|---|---|
| Reactor 1 | | |
| Stream 1 | Buffer Solution[1] | 36.74 |
| Stream 2 | Itaconic Acid | 1.75 |
| | Water | 33.360 |
| Stream 3 | Stabilized Persulfate Solution[2] | 7.325 |
| Stream 4 | Styrene | 59.00 |
| | t-dodecyl mercaptan | .298 |
| Reactor 2 | | |
| Stream 1 | Butadiene | 19.75 |
| Reactor 3 | | |
| Stream 1 | Buffer Solution[1] | 9.2 |
| Stream 2 | Stabilized Persulfate Solution[2] | 3.11 |
| Stream 3 | Butadiene | 20.038 |
| | t-dodecyl mercaptan | 0.161 |

[1]The buffer solution consisted of water, the sodium salt of EDTA, the surfactant system and tetrasodium pyrophosphate.
[2]the stabilized persulfate solution consisted of water, ammonium persulfate and tetrasodium pyrophosphate.

Before commencing polymerization, the first and second reaction zones were filled totally and the third reactor was filled 75% of the volume with a carboxylated latex to provide for a heel and the first reaction zone was heated to 71° C. Continuous polymerization was started by charging the four streams to reactor 1. All of the flows were maintained at a charge rate to provide for a total reaction zones of 9 hours. residence time in all four reaction zones of 9 hours. Polymerization was conducted under a pressure of 180–210 psig and moderate mixing was maintained in each of the four zones. The first reaction zone was maintained at 71° C. until a conversion of 5 to 7%. The second reaction zone was maintained at 84° C. until a conversion of 74 to 77%. The third reaction zone was maintained at 85° C. until a conversion of 85 to 87%. The latex was then withdrawn from reaction zone three and introduced to the fourth reaction zone maintained at 84° C. until a conversion of 95% was achieved.

The latex thus produced was partially neutralized to a pH of 6.0–6.5 with ammonium hydroxide and defoamer was added. The remaining latex was degassed and steam stripped. The latex was further neutralized to a pH of 9.0–9.5 after steam stripping and the other post additives such as dispersant, antioxidant and bactericide were added.

EXAMPLE 2

The following example in accordance with the present invention was carried out on a pilot plant scale. The pilot plant equipment consisted of one 1.5 gallon 316 stainless steel reactor (reactor 1) with three baffles and an agitator means and three 316 stainless steel 27 gallon reactors connected in series. Each 27 gallon reactor was equipped with three baffles and an agitator. Each 27 gallon reactor was jacketed for the circulation of heating and cooling medium which was controlled automatically to maintain desired polymerization temperature. Constant pressure higher than the autogenous pressure of the reaction mixture was also maintained with the backpressure regulator installed on the latex overflow outlet line on the last reactor.

Various solutions containing different reaction ingredients were premised in the make-up or charge tanks. Continuous charge streams were metered into the respective zones with high head centrifugal pumps. Metering was controlled with a Toshiba distributed control system.

The buffer solution (stream 1) and carboxylic monomer (stream 2) and styrene (stream 4) streams were premixed in a common header and charged through a common line connected at the bottom of the first zone. The stabilized persulfate stream (stream 3) was charged through a separate line also connected at the bottom of the first zone. The butadiene stream, designated for the second reaction zone (stream 5) was injected at the base of the second reaction zone. The buffer stream (stream 6), stabilized persulfate stream (stream 7) and butadiene (stream 8) were premised in a common header and injected at the base of the third zone. The reaction mixture was passed from the first to the second and to the third zone and finally to the fourth zone after a certain residence time in each zone, which is determined by charge rates and the zone capacity. The four-stage polymerized latex was continuously removed from the top of the last zone and subjected to further processing, i.e., steam stripping.

The carboxylated styrene.butadiene latex was based on the following formulation:

TABLE II

| Ingredient | | Active Parts By Weight (phm) |
|---|---|---|
| Reactor 1 | | |
| Stream 1 | Buffer Solution[1] | 36.746 |
| Stream 2 | Itaconic Acid | 1.5 |
| Stream 3 | Stabilized Persulfate Solution[2] | 7.325 |
| Stream 4 | Styrene | 59.00 |
| | t-dodecyl mercaptan | .298 |
| Reactor 2 | | |
| Stream 5 | Butadiene | 19.75 |
| Reactor 3 | | |
| Stream 6 | Buffer Solution[1] | 9.184 |
| Stream 7 | Stabilized Persulfate Solution[2] | 3.049 |
| Stream 8 | Butadiene | 20.038 |
| | t-dodecyl mercaptan | 0.161 |

[1]The buffer solution consisted of water, the sodium salt of EDTA, surfactant system, and tetrasodium pyrophosphate.
[2]the stabilized persulfate solution consisted of water ammonium persulfate and tetrasodium pyrophosphate.

Before commencing polymerization, all reactors were filled with a carboxylated latex to provide for a heel and the first reaction zone was heated to 71° C. Continuous polymerization was started by charging the three streams to reactor 1. All of the flows were maintained at a charge rate to provide for a total residence time in all four reaction zones of 9 hours. Polymerization was conducted under a pressure of 130 psig and moderate mixing was maintained in each of the four zones. The first reaction zone was maintained at 71° C. until a conversion of 5 to 7%. The second reaction zone was maintained at 85° C. until a conversion of 74 to 77%. The third reaction zone was maintained at 86° C. until a conversion of 85 to 87%. The latex was then withdrawn from reaction zone three and introduced to the fourth reaction zone maintained at 82° C. until a conversion of 95% was achieved.

The latex thus produced was partially neutralized to a pH of 6.0–6.5 with ammonium hydroxide and defoamer was added. The remaining latex was degassed and steam stripped. The latex was further neutralized to a pH of 9.0–9.5 after steam stripping and the other post additives such as dispersant, antioxidant and bactericide were added.

Table III below provides the physical data for the latex prepared in Example 2. As can be seen below, the 4-PCH level is significantly lower than in conventional latexes (100–250 ppm on a wet basis). In addition, the values for tensile, film stiffness (hand) and stress-strain relationship (elongation) are good.

TABLE III

| Bound Styrene | 61.6 |
| --- | --- |
| 200% Modulus | 1089 |
| 300% Modulus | 1600 |
| Tensile | 2554 |
| Elongation | 419 |
| Hand | 5 |
| Volume Swell | 711 |
| 4-PCH (ppm) Wet Basis | 37 |

What is claimed is:

1. A free radical emulsion polymerization process for the production of a latex comprising polymerizing at least one conjugated diene, (b) at least one non-carboxylic vinyl aromatic or non-carboxylic vinyl aliphatic comonomer selected from the group consisting of styrene, α-methyl styrene, p-methyl styrene, vinyl toluene, acrylonitrile, methacrylonitrile, vinylidene chloride, ethyl acrylate, butyl acrylate, vinyl pyridine, methylmethacrylate, hexylacrylate, 2-ethyl hexyl acrylate or mixtures thereof, and (c) at least one ethylenically unsaturated carboxylic acid monomer selected from the group consisting of acrylic acid, methacrylic acid, maleic acid, fumaric acid, itaconic acid, or mixtures thereof wherein the process comprises (a) initially polymerizing the non-carboxylic vinyl aromatic or noncarboxylic vinyl aliphatic comonomer in the presence of the unsaturated carboxylic acid and in the absence of any conjugated diene to a conversion of 3 to 12 percent to form a partially polymerized latex; and (b) copolymerizing the conjugated diene with the unreacted non-carboxylic comonomer in the partially polymerized latex.

2. The process of claim 1 wherein the conversion ranges from about 5 to 10 percent prior to the addition of any conjugated diene to the reaction.

3. The process of claim 1 wherein the polymerization process is conducted in four separate reaction zones.

4. The process of claim 3 wherein the conjugated diene is added to the second and third reaction zones.

5. The process of claim 3 wherein all of the ethylenically unsaturated carboxylic acid monomer is added to the first of four reaction zones.

6. The process of claim 4 wherein from about 45 to about 65 weight percent of the conjugated diene is added to the second reaction zone and the balance of conjugated diene is added to the third reaction zone.

7. The process of claim 3 wherein a portion of the unsaturated carboxylic acid is added to the first reaction zone and the remaining portion of unsaturated 8. The process of claim 1 wherein (1) the non. carboxylic comonomer is polymerized in a first reaction zone to a conversion of 3 to 12 percent; (2) from about 45 to about 65 weight percent of the conjugated diene to be reacted is added to the second reaction zone and copolymerized with the unreacted non carboxylic comonomer to a conversion of 60 to 85 percent; (3) the remaining portion of conjugated diene is copolymerized with the unreacted non-carboxylic comonomer to a conversion of from 70 to 99 percent in the third reaction zone and; (4) the partially polymerized latex is introduced to a fourth reaction zone and further polymerized to a conversion of from 80 to 100 percent.

9. The process of claim 1 wherein said conjugated diene is selected from the group consisting of 1,3-butadiene, isoprene, and 2,3-dimethyl butadiene.

10. The process of claim 9 wherein said conjugated diene is 1,3-butadiene.

11. The process of claim 1 wherein said non carboxylic comonomer is styrene.

12. The process of claim 1 wherein said ethylenically unsaturated carboxylic acid is itaconic acid.

13. The process of claim 8 wherein the partially polymerized latex is withdrawn from the first reaction zone continuously at a rate equal to the total rate of addition of the mixture of reagents to the first reaction zone.

14. The process of claim 9 wherein the partially polymerized latex is withdrawn from the second reaction zone continuously at a rate equal to the total rate of addition of the partially polymerized latex and additional reagents to the second reaction zone.

15. The process of claim 9 wherein the latex is withdrawn from the third reaction zone continuously at a rate equal to the total rate of addition of the partially polymerized latex and additional reagents to the third reaction zone.

16. The process of claim 8 wherein (1) the noncarboxylic comonomer is polymerized in a first reaction zone to a conversion of 5 to 10 percent; (2) from about 45 to 65 weight percent of the conjugated diene to be reacted is added to the second reaction zone and copolymerized with the unreacted non. carboxylic comonomer to a conversion of 70 to 80 percent; (3) the remaining portion of conjugated diene is copolymerized with the unreacted non carboxylic comonomer to a conversion of from 80 to 90 percent in the third reaction zone and; (4) the partially polymerized latex is introduced to a fourth reaction zone and further polymerized to a conversion of from 90 to 99 percent.

17. The process of claim 1 wherein sufficient conjugated diene, non-carboxylic comonomer and ethylenically unsaturated carboxylic acid are polymerized to provide a carboxylated polymer which is 20 to 60 percent by weight derived from the conjugated diene, 40 to 80 weight percent derived from said non carboxylic comonomer and 0.5 to 10 weight percent is derived from the ethylenically unsaturated carboxylic acid.

18. The process of claim 17 wherein the carboxylated polymer is derived from about 30 to 45 weight percent of the conjugated diene, 55 to 70 weight percent of the non-carboxylic comonomer and 1.5 to 2.5 weight percent of the ethylenically unsaturated carboxylated acid.

19. A carboxylated latex produced by the process of claim 1.

* * * * *